3,317,510
METHOD OF PREPARING POLYPHOSPHORUS-POLYOL ESTERS
Gail H. Birum, Kirkwood, Mo., assignor to Monsanto Company, St. Louis, Mo., a corporation of Delaware
No Drawing. Filed Oct. 20, 1965, Ser. No. 498,995
10 Claims. (Cl. 260—210)

This invention relates to the preparation of phosphorus containing fire resistant organic alcohols and to a process of preparing them.

An object of this invention is to provide a process for obtaining new fire resistant organic alcohols.

A further object of this invention is to provide a method of incorporating phosphorus and halogen-containing ester groups into organic polyhydric alcohols to increase the burn resistance of said polyols and polymer systems into which they may be incorporated.

Briefly, according to this invention an organic polyol containing from 2 to about 10 hydroxyl groups per molecule is heated with a trivalent phosphorus-containing polyphosphorus ester for a time and at a temperature sufficient to effect reaction between the polyhydric alcohol and the trivalent phosphorus ester moiety of the polyphosphorus ester to obtain a phosphorus ester containing polyhydric alcohol product which may be used as an additive or as a reactant in the preparation of polyester and polyurethane resins and foams.

More particularly, this invention provides a process for the preparation of burn resistant polyols by heating from about 50° C. to 200° C. a mixture of (a) an organic polyol having a molecular weight of from about 62 to about 5000 and from 2 to about 10 hydroxyl groups per molecule with (b) a phosphite-phosphonate ester of the formula

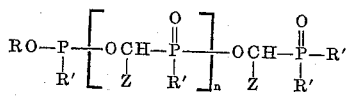

wherein R is selected from the class consisting of alkyl, haloalkyl, alkenyl, haloalkenyl, alkoxyalkyl, aryloxyalkyl, alkoxyhaloalkyl and aryloxyhaloalkyl radicals having from 1 to 12 carbon atoms; each R' is selected from the class consisting of the radicals defining R, —OR and aromatic hydrocarbon and halohydrocarbon having from 6 to 12 carbon atoms, with —OR and R' being taken together to denote a bivalent alkylene or arylene radical having 2 carbon atoms in a dioxaphospholane ester ring and a total of from 2 to 8 carbon atoms, and said radicals containing chlorine and bromine substituents; Z is selected from the class consisting of hydrogen and hydrocarbon, halohydrocarbon, carboalkoxyhydrocarbon, alkylthiohydrocarbon, alkyloxyhydrocarbon, and cyanohydrocarbon radicals having from 1 to 17 carbon atoms, and the furyl and thienyl radicals, and $n$ is an average number of from 0 to about 20. In some cases the reaction between the polyol (a) and the phosphite-phosphonate (b) may be effected to some extent by stirring the mixture at room temperature at reduced, ordinary, or elevated pressure for extended periods of time. As a practical matter, however, it is preferred to heat the mixture to from 50° to 200° C. at ordinary or reduced pressure for from about 0.25 to 10 hours while distilling off any volatile alcohol by-product produced in the reaction to insure the degree of reaction desired. The proportions of the polyol (a) and the phosphite-phosphonate (b) that are combined will be governed by the uses contemplated for the product. In general, however, the proportion of polyol used relative to the phosphite-phosphonate reactant will be at least sufficient to provide a phosphorus-containing polyol product having the equivalent of at least about one hydroxyl group per molecule free and available for further reaction. Thus, for example, when a trihydric alcohol such as glycerol is used, the amount of phosphite-phosphonate used will be that amount sufficient to react with up to two hydroxyl groups of the glycerol. Further, when pentaerythritol is used, the phosphite-phosphonate can be allowed to react with up to three of the hydroxyl groups, leaving one or more unreacted hydroxyl groups.

The reaction between the polyol and the phosphite-phosphonate is effected by transesterification, producing an alcohol by-product which is generally removed from the product by conventional means. A conventional way of removing the alcohol by-product is to conduct the reaction by heating the reaction mixture to somewhat elevated temperatures and to reduce the pressure to easily distill out the alcohol by-product produced. The end of the reaction desired can be determined by noting the amount of this alcohol by-product produced, or by noting refractive index, infrared spectra, viscosity or other physical properties. When the trivalent phosphorus of the phosphite-phosphonate reactant is in a 1,3,2-dioxaphospholane ring, the major reaction is ring-opening of the phospholane ring. In such cases little, if any, volatile by-product alcohol is produced, and reduction of pressure during the reaction may be unnecessary.

For some applications of the products, it is desired to react the phosphite-phosphonate with large excesses of the polyol. In such cases the preparer is only interested in providing a product having a desired percentage of flame retarding components therein such as phosphorus, chlorine, bromine, etc., and enough of the phosphite-phosphonate ester reactant containing these components will be used to provide that amount.

The organic polyols useful for preparing the polyphosphorus polyols of this invention include diols, polyols, and polyether, polyester and polyesteramide polyols having hydrogen atoms that are reactive with isocyanates to prepare polyurethanes or with polycarboxylic acids or anhydrides thereof to prepare polyesters. Generally, these materials have molecular weights ranging from about 62 to about 5000 and have from 2 to about 10 or more hydroxyl groups per molecule and weight percent hydroxyl contents ranging from about 0.5 to about 50%. They generally have hydroxyl numbers of from about 25 to as high as about 800. These materials are referred to conveniently as the "polyol" reactant. The useful active hydrogen-containing polyols include the large family of adduct compounds which result when ethylene oxide, propylene oxide, 1,2- and 2,3-butylene oxide, or other alkylene oxides are added to active hydrogen compounds such as glycols and polyols represented by ethylene glycol, propylene glycol, glycerol, 4-ethyl-1,4,5-heptanetriol, 3,6-dimethyl-2,3,6-heptanetriol, 2,3,6,7-tetramethyl-2,3,6,7-octanetetrol, 2,3,8,9-tetramethyl-2,3,8,9-decanetetrol, 4,7-dipropyl-5-decyne-3,4,7,8-tetrol, 2-ethyl-2-(hydroxymethyl)-1,3-propanediol, pinacol, erythritol, pentaerythritol, 1, 2,3- or 1,2,4-butanetriol, 2-tert-butyl-1,2,5-pentanetriol, 1,3,4-, 1,3,5-, or 2,3,4-pentanetriol etc. as well as the aromatic polyols such as pyrogallol, phloroglucinol, 1,2,4-benzenetriol, benzenetrimethanol, 1,2,3,4- or 1,2,3,5-benzenetetrol, 1,2,4,5-benzenetetramethanol, and the alicyclic polyhydric compounds such as 1,2,3,4-cyclohexanetetrol, 1,2,3-cyclohexanetriol, 1-methyl-1,2,4-cyclohexanetriol, octahydro-4,4,7-trimethyl-1,7,8A-(1H) naphthalenetriol, 2-(1-hydroxycyclohexyl)-5-methyl-3-hexene-2,5-diol, 1,3,5-cyclohexanetriol, and monosaccharide and disaccharide carbohydrates such as threose, erythrose, lyxose, xylose, arabinose, ribose, talose, galactose, idose, gulose, mannose, glucose, altrose, allose, fructose as well as alcohol reduction products of such monosaccharides such as sorbitol, mannitol, etc., and the disaccharides such as maltose, lactose, sucrose, etc., and the methyl and ethyl glycoside derivatives thereof obtained by treating the selected mono- or disaccharide with methyl or ethyl alcohol and hydrogen chloride, e.g. methyl glucoside, ethyl taloside, methyl mannoside, ethyl guloside, etc.

The term polyol also includes addition products of such alkylene oxides to various amines, alkylenediamines, and polyalkylenepolyamines such as methylamine, ethylenediamine, propylenediamine, tetraethylenepentamine, etc. Various amounts of these alkylene oxides may be added to the base polyol or amine molecules referred to above, depending upon the use intended for the polyol, e.g., the amount of flexibility desired in products made from the polyol. For example, when these polyols are to be used to make a flexible polyurethane more alkylene oxide is added to the base molecule.

For example, a polyol for use in making flexible foams could well be represented by glycerine to which sufficient propylene oxide was added to give a final hydroxyl content of about 1.7%. Such a material would have a molecular weight of about 3000 and have a glycerine to propylene oxide molar ratio of about 1 glycerine to 50 propylene oxide. Such polyols can also be used in the process of this invention.

Polyester-polyols are those prepared by esterification type of reactions from polyfunctional acids and anhydrides and polyfunctional alcohols as the active hydrogen compound. Typical acids used for making these polyester polyols are maleic, phthalic, succinic, fumaric, tetrahydrophthalic, chlorendic, and tetrachlorophthalic acids. Typical polyols are ethylene, propylene, butylene, diethylene, and dipropylene glycols, and polyethylene and polypropylene glycols, and glycerine, trimethylolpropane, hexanetriol, pentaerythritol, sorbitol, and the like. Where available, the above mentioned acids may be used in the anhydride form, if desired.

In making the polyester-polyols any of the polyfunctional acids or anhydrides or mixtures thereof are caused to react with an excess amount of the glycols, polyols, or mixtures thereof such that the final polyol contains predominantly hydroxyl end groups. The degree of hydroxyl functionality and the percent hydroxyl is easily varied to provide the desired polyol.

The trivalent phosphorus polyphosphorus esters used as reactant (b) in preparing the polyol products of this invention are now well known compounds having been described in patents such as 3,014,951 and 3,014,954. Examples of useful products disclosed in the 3,014,951 patent which may be used herein as reactants are bis(2-chloropropyl) phosphite of bis(2-chloropropyl) (1-hydroxypropyl) phosphonate [also known as bis(2-chloropropyl) 1-[bis(2-chloropropoxy)phosphinyl]propyl phosphite], and bis(2-chloroethyl) 1-[bis(2-chloroethoxy)phosphinyl]ethyl phosphite. Preferred phosphite-phosphonate esters of this type are prepared by adding and reacting a suitable carbonyl compound, preferably an aldehyde, to an equimolar mixture of a bis(haloalkyl) phosphorochloridite or phosphorobromidite and a tris(haloalkyl) phosphite to obtain the suitable phosphite-phosphonate ester reactant used in this invention.

Examples of trivalent phosphorus-polyphosphorus esters described in U.S. Patent 3,014,954 which may be used include the phosphite-polyphosphonate product obtained by adding acetaldehyde to 3:1 molar ratio mixture of bis(2-chloroethyl) phosphorochloridite and tris(2-chloroethyl) phosphite to obtain a phosphite-polyphosphonate of the formula

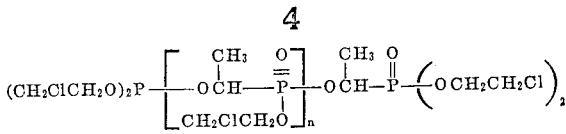

where $n$ has an average value of 2. A similarly useful product having an average $n$ value of about 20 is obtained by adding 3.82 molar proportions of acetaldehyde to the reaction product of 4.0 molar proportions of phosphorus trichloride and 8.18 molar proportions of ethylene oxide at 45°–50° C. with cooling in about 0.5 hour, and then warming the mixture slowly to reflux and maintaining the mixture at reflux (91°–94° C.) for about 0.5 hour. The resulting phosphite-polyphosphonate is mixed with by-product 1,2-dichloroethane which can be removed under vacuum or left in contact with the product for reaction with the polyol and removed in one step with the alcoholic by-product of the transesterification reaction involved in this invention.

As suggested above it is preferred to use phosphite-phosphonate esters as the trivalent phosphorus containing polyphosphorus reactant in this invention. It is even more preferred to use phosphite-phosphonate, and phosphite-polyphosphonate esters which are obtainable from simple commercially available chemicals. Thus, it is preferred to use such products obtained by reacting phosphorus trichloride or phosphorus tribromide, or a mixture of them, with ethylene oxide or propylene oxide, or a mixture of them in desired proportions to get as intermediate product a mixture of bis(2-haloalkyl) phosphorohalidite and tris(2-haloalkyl) phosphite where the halidite is chloridite or bromidite and the halo-alkyl is chloroethyl, bromoethyl, chloropropyl, or bromopropyl, and then to add an economical aldehyde such as acetaldehyde to the mixture to obtain the phosphite-phosphonate product.

Other useful trivalent phosphorus-containing polyphosphorus esters which may be used as reactants herein are the cyclic 5-membered trivalent phospholane-pentavalent phosphorus esters obtained, e.g., by reacting a 2-chloro-1,3,2-dioxaphospholane, a carbonyl compound, and a trivalent phosphorus ester as described in U.S. Patent 3,014,948. In the preparation of such compounds no halohydrocarbon by-product need be produced. When such cyclic phosphite-phosphonates are reacted with polyols according to this invention, the major reaction is ring-opening of the phospholane ring, and little, if any, volatile by-product alcohol is produced. Hence, operating with these phospholane-phosphonates, it is usually unnecessary to provide for removal of low-boiling by-products from the phosphorus-containing polyol products.

Some other useful trivalent phosphorus containing polyphosphorus compounds which may be used as reactants in this invention are the aromatic di-functional trivalent phosphorus-containing phosphorus esters obtained e.g., by reacting a bis-aryl phosphorochloridite, and aldehyde, and a triorgano phosphite ester as described in U.S. Patent 3,014,950; and phosphite diphosphinyl esters obtained by reacting an aromatic phosphorus dihalide, an aldehyde, and a triorgano phosphite as described for example as shown in U.S. Patent 3,014,946.

The phosphorus ester polyol product may contain isomeric structures as well as varying amounts of decomposition products and halohydrocarbon by-products obtained in the intermediate steps of the phosphorus ester preparation and alcohol by-products obtained in the final transesterification reaction involved in the process of this invention. The by-products may be removed if desired by suitable vacuum distillation procedures. It is not generally necessary or desired to remove isomeric products because they are useful for the same purposes. However, for purposes of illustration, an example of the preparation of a phosphorus-containing polyol according to this invention is summarized by the following equation using (a) methyl glucoside and (b) bis(2-chloroethyl) 1-[bis(2-chloroethoxy)phosphinyl]ethyl phosphite as equimolar reactants.

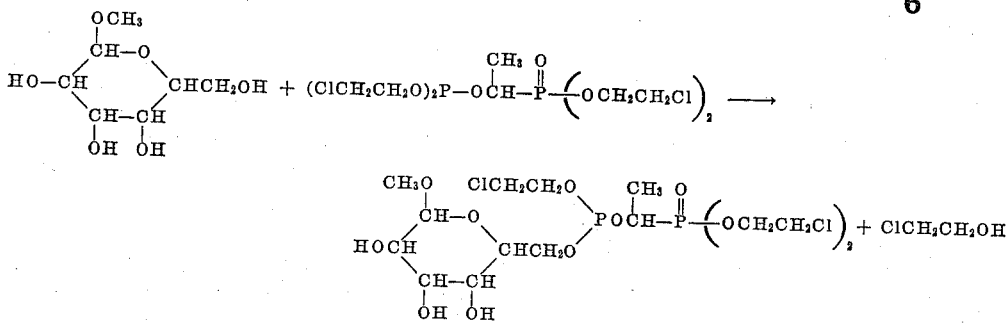

In some cases the trivalent phosphorus may be converted to the more stable pentavalent state by thermal rearrangement as illustrated by the following equation:

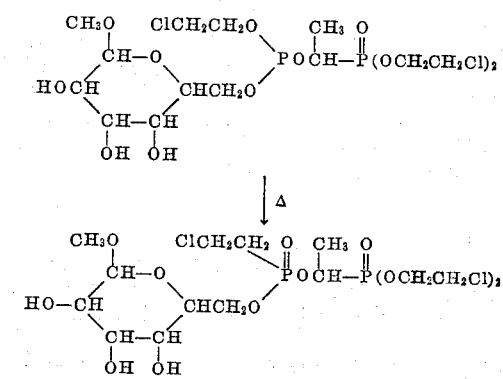

If desired, the stability of the phosphorus ester alcohol product may also be improved by oxidation of any remaining trivalent phosphorus by treatment with oxidizing agents such as hydrogen peroxide, sulfur, cumene hydroperoxide, etc.

These polyphosphorus ester-containing polyols are useful for numerous applications including their use as plasticizers for various polymer systems such as polyvinyl chloride, vinyl chloride copolymers such as vinyl chloride/vinyl acetate, and vinyl chloride/ethylene various acrylate polymers such as polymethyl methacrylate, and other acrylate resin systems, but they are particularly useful as intermediates as the polyol component in the manufacture of polyesters and polyurethane resins and foams to impart "built in" flexibility and flame-retardance thereto. For example, the polyol product of this invention may be reacted with arene-polyisocyanates having from 2 to 3 isocyanate groups per molecule and from 1 to 3 phenylene rings as the only aromatic ring system such as m-phenylene diisocyanate, 2,4-toluene diisocyanate, triphenylmethanetriisocyanate, and the like. Polyurethane foams made from phosphorus containing polyols of this invention are exceptionally good foams since they impart flame resistance without degrading other desired properties of the foam such as foam durability and hydrolytic stability. This invention also provides a means for incorporating other "built-in" flame retarding elements such as chlorine and bromine by having such halogens in the ester radicals of the phosphorus ester. The presence of such elements reduces the requirements of phosphorus to obtain a given flame resistance performance of the polyester or polyurethane. For example, most flame retardants containing only phosphorus (no halogen) are required to be present in amounts sufficient to provide about 1% phosphorus level in a polyurethane foam to give extinguishment at a 10% burn value. The presence of halogens in the products as provided by this invention reduces the requirements of phosphorus to obtain the same extinguishment proficiency.

The invention is further illustrated by the following examples.

*Example 1*

A 695 g. portion of a solution of (I)

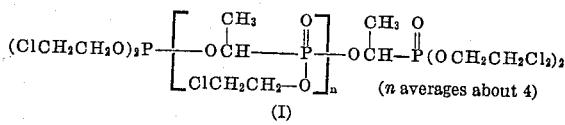

and dichloroethane by-product, containing about 0.445 mole of (I), was placed in a reaction vessel and warmed under reduced pressure to 100° C./0.5 mm. to remove 196 g. of 1,2-dichloroethane therefrom, and then 60.6 g. (0.445 mole) of pentaerythritol was stirred into the phosphite-polyphosphonate residue at about 100° C. The reaction mixture was placed under reduced pressure and warmed from 100° to 192° C./35 mm. in 0.75 hour. The reaction mixture became homogeneous at about 150° C. A total of 59.5 g. of colorless distillate, containing 2-chloroethanol, was collected in a Dry Ice trap during this time. There remained as residue 498 g. of a colorless, viscous phosphite-polyphosphonate/pentaerythritol reaction product. It had major phosphorus nuclear magnetic resonance (NMR) peaks at −94.4, −27.9, and −21.5 p.p.m. (relative to phosphoric acid) and contained 16.4% phosphorus, 20.6% chlorine and 4.3% as alcoholic hydroxyl groups.

*Example 2*

A 685 g. portion of the crude phosphite-polyphosphonate solution, described in Example 1, was concentrated to 100° C./1 mm. to remove 194 g. of 1,2-dichloroethane by-product therefrom, leaving about 0.439 mole of the phosphite-polyphosphonate as residue. To this residue at about 100° C. there was added 85.2 g. (0.439 mole) of methyl glucoside with stirring. The mixture was warmed to 192° C. in 0.5 hour at 100 mm. pressure and then finally concentrated to 160° C./1 mm. A total of 48.5 g. of 2-chloroethanol was removed from the reaction mixture leaving 525.5 g. of a colorless, very viscous phosphite-polyphosphonate/methyl glucoside reaction product having phosphorus NMR peaks at −26.9 and −21.3 p.p.m., and containing 15.5% phosphorus, 18.8% chlorine and 4.0% alcoholic hydroxyl groups.

*Example 3*

A 3-liter vessel equipped with a Dry Ice condenser, thermometer, Teflon stirrer, and dropping funnel with a sub-surface extension was charged with 1100 g. (8.0 moles) of phosphorus trichloride (PCl$_3$) and 5.5 g. of 2-chloroethanol as initiator-catalyst. Propylene oxide, 1083 g. (18.67 moles), was added under nitrogen in 1.1 hours at 15–20° C. Then, after sampling, 234.5 g. (5.33 moles) of freshly distilled acetaldehyde was added under nitrogen in 0.3 hour, largely at 55–57° C. The resulting reaction mixture was heated to 110° C. in 0.6 hour and kept at 110°–113° C. for 0.2 hour to insure complete reaction, giving 2397 g. of a solution of 1,2-dichloropropane and crude phosphite-polyphosphonate (II) of the formula

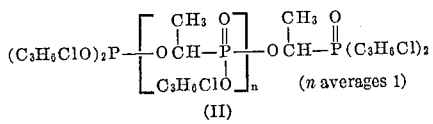

(II)  (n averages 1)

A 799 g. portion of the solution containing phosphite-polyphosphonate (II) was concentrated to 100° C./1 mm. to remove 197.5 g. of 1,2-dichloropropane therefrom, and then 121 g. of pentaerythritol (equimolar to the phosphorus ester) was added at 90°–100° C. When the pressure was reduced to 35 mm. at 100° C., chloropropanol began distilling through a 6″ Vigreux. Distillation continued as the reaction mixture was warmed to 185° C./10 mm. in 0.6 hour. The reaction mixture became homogeneous at about 160° C. The distillate (mainly chloropropanol) weighed 175 g. There was left as a colorless residue the phosphite-polyphosphonate/pentaerythritol reaction product having phosphorus NMR peaks at −92.6, −25.3 and −19.6 p.p.m. (relative to phosphoric acid) and containing 14.6% phosphorus, 17.6% chlorine and 5.4% as alcoholic hydroxyl groups.

*Example 4*

A 799 g. portion of the phosphite-polyphosphonate solution prepared as described in Example 3 was concentrated to 100° C./1 mm. to remove 197 g. of 1,2-dichloropropane by-product. Then 173 g. (0.89 mole) of methyl glucoside was added to the colorless residue (II) at 75° C. and the mixture was stirred and warmed to 190° C./10 mm., giving 141 g. of crude by-product chloropropanol distillate, and leaving the phosphite-polyphosphonate/methyl glucoside reaction product. After removing 12 g. portion thereof, the remainder of the phosphine-polyphosphonate/methyl glucoside reaction product was treated with 29 g. (0.5 mole) of propylene oxide at 97°–85° C. for 0.2 hour. The reaction mixture was stirred at 75°–85° C. for 0.5 hour more and then concentrated to 90° C./1 mm. to give 616 g. of colorless, viscous phosphite-polyphosphonate/methyl glucoside/propylene oxide polyol containing 12.6% phosphorus, 16.6% chlorine and 5.6% as alcoholic hydroxyl groups.

*Example 5*

This example illustrates the preparation of the useful phosphite-polyphosphonate/polyol reaction products without the co-preparation of the chlorohydrin and dihaloalkane by-products.

A 379.5 g. (3.0 mole) portion of distilled 2-chloro-1,3,2-dioxaphospholane was placed in a vessel, and then 58.0 g. (1.0 mole) of propylene oxide was added under nitrogen in 0.2 hour with cooling at 15°–25° C. to produce a mixture of 2-chloro-1,3,2-dioxaphospholane and 2-(chloropropoxy)-1,3,2-dioxaphospholane. Freshly distilled acetaldehyde, 88.1 g. (2.0 moles) was then added in 0.2 hour at 30°–40° C. The reaction mixture was warmed at 60°–70° C. for 1 hour and concentrated to 90° C./1 mm. Methyl glucoside (97 g.) was then stirred in at 70° C., and the reaction mixture was warmed in 0.5 hour to 145° C./1 mm. to insure reaction of the methyl glucoside. The trivalent phosphorus of the product was converted to the pentavalent state by adding 3.5 g. of sulfur and warming the stirred mixture to 138° C. The reaction mixture was cooled to 90° C. and treated with 58 g. of propylene oxide in 0.2 hour at 20–90° C., and stirred at 70°–80° C. for 0.5 hour more. After standing overnight, the mixture was concentrated to 110° C./1 mm. to remove any unreacted propylene oxide, leaving 563 g. of a thiophosphate-polyphosphonate/methyl glucoside/propylene oxide polyol containing 14.2% phosphorus, 16.0% chlorine and 4.6% as alcoholic hydroxyl groups.

*Example 6*

A mixture of 399.5 g. (about 0.44 mole) of the phosphite-polyphosphonate (II), described in Example 3, in a solution in 1,2-dichloropropane by-product, and 40.4 g. (0.22 mole) of sorbitol was warmed to 150° C./1 mm. to give a phosphite-polyphosphonate/sorbitol transesterified product containing 14.2% phosphorus, 19.9% chlorine, and 7.1% alcoholic hydroxyl groups.

*Example 7*

A mixture of 483 g. (0.793 mole) of crude phosphite-polyphosphonate of the type described in Example 1 and where n averages about 1, and 72.2 g. (0.397 mole) of sorbitol was warmed to 160°/1 mm. to give as residue 469 g. of colorless phosphite-polyphosphonate/sorbitol reaction product having major phosphorus NMR peaks at −26.3 and −20.5 p.p.m. and containing 15.4% phosphorus, 22.3% Cl and 7.6% alcoholic hydroxyl groups.

*Example 8*

A 1 liter flask equipped with a stirrer, thermometer, and 6 in. Vigreux column was charged with 387.5 g. of the propylene dichloride solution of phosphite-polyphosphonate (II) described in Example 3 and with 94.5 g. (0.42 mole) of 2,2,6,6-tetrakis-(hydroxymethyl)cyclohexanol. This mixture was then warmed to 180° C. at reduced pressure. A total of 161.2 g. of by-product propylene dichloride and chloropropanol was collected, leaving 318.5 g. of the 1:1 phosphite-polyphosphonate/2,2,6,6-tetrakis-(hydroxymethyl)cyclohexanol reaction product containing 15.88% chlorine, 12.14% phosphorus, and 7.46% hydroxyl as compared with 15.8% chlorine, 12.5% phosphorus, and 7.6% hydroxyl, the calculated values. The product had major phosphorus NMR peaks at −26.1 and −20.1 p.p.m.

*Example 9*

To a reaction vessel equipped as described in Example 8, there were added 306 g. (0.50 mole) of a phosphite-polyphosphonate of the type shown in Example 1, except that n averaged 1, and 265 g. of a propoxylated methyl glucoside composition having an average molecular weight of about 528 and an hydroxyl number of 426 ("EPO 152" of Wyandotte Chemical Company). This mixture was stirred and warmed at reduced pressure to 180° C. in 1 hour. The temperature of the mixture was held at 175°–180° C. for an additional 0.5 hour to insure complete reaction and to remove volatile by-products. Nitrogen flow was used toward the end to aid removal of 2-chloroethanol vapor. A total of 41.2 g. of by-product was collected. There remained as residue 529 g. of the phosphite-polyphosphonate/propoxylated-methyl glucoside product having phosphorus NMR peaks at −28.1 and −22.5 p.p.m. and containing 13.43% chlorine, 8.76% phosphorus, and 5.54% hydroxyl as compared with 13.33% chlorine, 8.28% phosphorus, and 4.78% hydroxyl, the calculated values.

*Example 10*

This example illustrates the preparation of a flame-retarded polyol, that is, one which is ready for use in making polyesters and polyurethane, e.g., by reacting the flame-retarded polyol with an organic diisocyanate to make a flame retarded polyurethane. In this example a flame retarded polyol is prepared by the reaction of a phosphite-polyphosphonate having a structure as described in Example 1, except that n has an average value of 1, with a large excess of the selected organic polyol, in this case "EPO 152" propoxylated methyl glucoside. The relative proportions of the phosphite-polyphosphonate and the propoxylated methyl glucoside being chosen to provide a phosphorus-containing polyol product which can then be reacted with an organic diisocyanate such as tolylenediisocyanate to obtain polyurethane containing about 1 percent phosphorus.

To a 3 liter flask equipped with stirrer, thermometer, and distillation head with a receiver cooled in Dry Ice there was added 1514 g. of "EPO 152" propoxylated methyl glucoside having a hydroxyl number of 426, and 218 g. (0.357 mole) of the phosphite/polyphosphonate having a formula as described in Example 1, except that n had an average value of 1. The pressure was reduced to 10 mm. and the mixture was stirred and warmed to 180° C. in 1 hour. The mixture was held at 170°–180° C. for 0.5 hour at 10 mm. to insure complete reaction and then the pressure was reduced to about 1 mm. for 5 minutes to aid in removal of 2-chloroethanol vapor. A total of 40.3 g. of distillate was collected. There remained as residue 1693 g. of the phosphite-polyphosphonate/propoxylated methyl glucoside product which contained 11.28% hydroxyl, 2.51% chlorine, and 1.70% phosphorus as compared with 11.05% hydroxyl, 2.72% chlorine, and 1.96% phosphorus, the calculated values.

*Example 11*

The procedure of Example 10 was repeated except that in place of the excess "EPO 152" propoxylated methyl glucoside there was used 1516 g. of propoxylated sucrose ("Voranol RS 410" of The Dow Chemical Company) with 215 g. of the same phosphite-polyphosphonate described in Example 10. At the end of the heating step under reduced pressure 74.3 g. of distillate (mostly 2-chloroethanol) was collected leaving as residue 1656 g. of the phosphite - polyphosphonate/propoxylated sucrose product as an amber, viscous liquid, analyzing as containing 10.08% hydroxyl, 1.98% chlorine, and 1.97% phosphorus as compared with 10.65% hydroxyl, 1.77% chlorine, and 1.98% phosphorus, the calculated values.

What is claimed is:

1. A process for preparing a phosphorus-containing polyol which comprises heating to 50°–200° C. a mixture of (a) an organic polyol having a molecular weight of from 62 to about 5000 and from 2 to about 10 hydroxyl groups per molecule with (b) a trivalent phosphorus ester of the formula

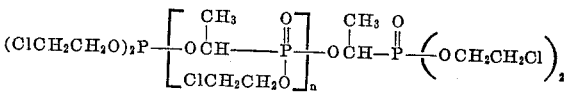

wherein R is selected from the group consisting of alkyl, haloalkyl, alkenyl, haloalkenyl, alkoxyalkyl, haloalkoxyalkyl, aryloxyalkyl, alkoxyhaloalkyl, and aryloxyhaloalkyl radicals having from 1 to 12 carbon atoms; each R' is selected from the group consisting of the radicals defining R, —OR, and aromatic hydrocarbyl and halohydrocarbyl radicals having from 6 to 12 carbon atoms, and —OR and R' taken together with the phosphorus atom to which they are bonded complete a dioxaphospholane ester ring having a total of from 2 to 8 carbon atoms; each Z is selected from the group consisting of hydrogen, and hydrocarbyl, halohydrocarbyl, carboalkoxyhydrocarbyl, alkylthiohydrocarbyl, alkyloxyhydrocarbyl, and cyanohydrocarbyl radicals having from 1 to 17 carbon atoms, and the furyl and thienyl radicals, and $n$ is an average number of from 0 to about 20, for a time sufficient to effect a transesterification reaction in the reaction mixture.

2. A composition of matter prepared as described in claim 1.

3. A process as described in claim 1 wherein the polyol (a) is a hydrocarbon polyol having from 2 to 18 carbon atoms and from 2 to 10 hydroxyl groups, and the polyphosphorus ester (b) mixed with the polyol is mixed with a halohydrocarbon by-product.

4. A composition of matter prepared as described in claim 3.

5. A process as described in claim 1 wherein the polyol (a) used is a propylene oxide adduct of a carbohydrate molecule containing up to two saccharide units, and the polyphosphorus ester (b) used is obtained by adding an alkanecarboxaldehyde having from 1 to 17 carbon atoms to a mixture of a bis(haloalkyl) phosphorohalidite and a tris(haloalkyl) phosphite, wherein the halidite is selected from the group consisting of -chloridite and -bromidite and the haloalkyl is selected from the group consisting of chloroethyl, chloropropyl, bromoethyl, and bromopropyl.

6. A composition of matter prepared as described in claim 5.

7. A process as described in claim 3 wherein the hydrocarbon polyol (a) is pentaerythritol and the polyphosphorus ester (b) has the formula

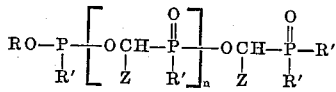

wherein $n$ averages between 0 and 5.

8. A composition of matter prepared as described in claim 7.

9. A process as described in claim 5 wherein said propylene oxide adduct of a carbohydrate (a) is propoxylated methyl glucoside and the polyphosphorus ester (b) used is obtained by adding acetaldehyde to a mixture of bis(2-chloroethyl) phosphorochloridite and tris(2-chloroethyl) phosphite.

10. A composition of matter prepared as described in claim 9.

References Cited by the Examiner

UNITED STATES PATENTS

| | | | |
|---|---|---|---|
| 3,014,944 | 12/1961 | Birum | 260—931 |
| 3,014,954 | 12/1961 | Birum | 260—931 |
| 3,092,651 | 6/1963 | Friedman | 260—234 |
| 3,153,036 | 10/1964 | Mertin et al. | 260—234 |
| 3,219,658 | 11/1965 | Friedman | 260—234 |

LEWIS GOTTS, *Primary Examiner.*

ELBERT L. ROBERTS, *Examiner.*

JOHNNIE R. BROWN, *Assistant Examiner.*